(12) United States Patent
Motter et al.

(10) Patent No.: US 8,314,926 B2
(45) Date of Patent: Nov. 20, 2012

(54) APPARATUS FOR OPTICAL FIBER TESTING

(75) Inventors: Jeffrey L. Motter, Plano, TX (US);
John A. Fasolino, Allen, TX (US);
Steven L. Franks, Garland, TX (US);
Michael D. Pollock, Sachse, TX (US);
Stephen J. Clark, Celina, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 341 days.

(21) Appl. No.: 12/577,391

(22) Filed: Oct. 12, 2009

(65) Prior Publication Data

US 2011/0085158 A1    Apr. 14, 2011

(51) Int. Cl.
*G01N 21/00* (2006.01)

(52) U.S. Cl. ....................................... 356/73.1

(58) Field of Classification Search .................. None
See application file for complete search history.

(56) References Cited

U.S. PATENT DOCUMENTS

| | | | |
|---|---|---|---|
| 7,113,267 B1 * | 9/2006 | Suzuki et al. | 356/73.1 |
| 2003/0030859 A1 * | 2/2003 | Youn et al. | 359/110 |
| 2004/0057039 A1 * | 3/2004 | Matsuura et al. | 356/72 |

* cited by examiner

*Primary Examiner* — Tu Nguyen (57) ABSTRACT

An apparatus for fiber optic testing is presented. In one exemplary embodiment, the apparatus may comprise a plurality of fiber optic connectors for coupling to one or more fiber optic cables, one or more photodetectors operatively connected to the plurality of fiber optic connectors, an optical power measurement module operatively connected to the one or more photodetectors, a display for displaying information received from the optical power measurement module, and one or more user controls for accepting user input.

20 Claims, 7 Drawing Sheets

APPARATUS FOR OPTICAL FIBER TESTING

BACKGROUND INFORMATION

Fiber optic diagnostic testing often occurs in the field. For example, fiber optic diagnostic testing is performed in central offices, at telecom sites, at carrier hotels, at enterprise network cabinets, at Controlled Environment Vaults (CEVs), in manholes, at handholes, or anywhere a fiber optic connector requires diagnosis. Diagnostic testing may be performed as part of system testing, trouble shooting, installation, and maintenance. Due to the variety of standards for fiber optic equipment, sale of telecom entities, evolution of fiber optic technology and other factors, a single fiber optic interface is not prevalent in the field. Telecom diagnostic equipment provides a single fiber optic interface. Changing fiber optic interfaces requires changing a connector on a piece of diagnostic equipment. Changing connectors requires time and risks damage to the equipment or impairment to the connection via exposure to contaminants. Additionally, the operating conditions may be in a cramped environment, such as a manhole. Connectors may frequently be lost or damaged.

Fiber optic diagnostic testing frequently uses transmission of test signals in addition to measurement of received signals. The transmission of test signals requires a light source that is provided as a separate piece of equipment from test equipment used to measure a received signal. Other diagnostic equipment is also utilized in fiber optic diagnostic testing. Certain testing such as identifying whether a particular fiber optic cable is sending or receiving a signal may require testing a port on a piece of fiber optic equipment (e.g., a cross connect) as well as testing a connector on a fiber optic cable. The switching between multiple connectors and pieces of equipment requires time to avoid damage, contamination, loss, and mistakes.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

An exemplary embodiment provides a fiber optic diagnostic testing apparatus. The fiber optic diagnostic testing apparatus may provide a plurality of fiber optic connectors for transmitting and receiving signals. The plurality of connectors may allow coupling to fiber optic cables using connectors complying with a plurality of standards and interfaces.

Figure 1A:
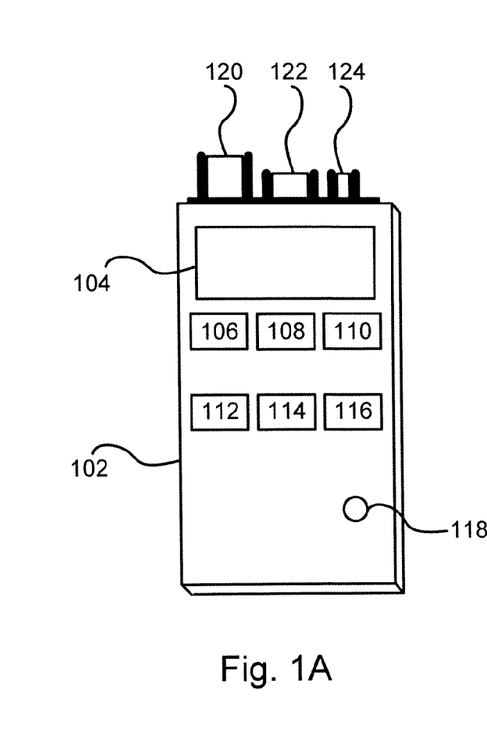
FIG. 1A is a diagram of a fiber optic diagnostic testing apparatus operatively connected to a plurality of fiber optic connectors, in accordance with an exemplary embodiment.

Referring to FIG. 1A, a fiber optic diagnostic testing apparatus in accordance with an exemplary embodiment is illustrated. Fiber optic diagnostic testing apparatus 102 may contain a plurality of fiber optic connectors for coupling to fiber optic cables such as, by way of non-limiting example, connectors 120, 122, and 124. Fiber optic diagnostic testing apparatus 102 may include one or more displays such as display 104. Fiber optic diagnostic testing apparatus 102 may include one or a plurality of user interface controls such as user interface controls 106, 108, 110, 112, 114, and 116. Fiber optic diagnostic testing apparatus 102 may contain one or more indicators, such as indicator 118.

Fiber optic connectors 120, 122, and 124 may comprise fiber optic connectors complying with different standards. For example, fiber optic connector 120 may be a Standard Connector (SC) which may comply with a standard such as International Electrotechnical Commission (IEC) 61754-4. Fiber optic connector 122 may be a Ferrule Connector (FC) which may comply with a standard such as IEC 61754-13. Fiber optic connector 124 may be a Local Connector (LC) which may comply with a standard such as IEC 61754-20. Other standards or specifications for fiber connectors may be utilized. Fiber optic connectors 120, 122, and 124 may be capable of securely fastening to and detaching from fiber optic cables to allow fiber optic diagnostic testing apparatus 102 to operatively connect to fiber optic cables of different standards. As described in greater detail in reference to FIG. 2B below, fiber optic connectors 120, 122, and 124 may comprise a plurality of components which may allow the interface type to be quickly and easily changed.

Returning to FIG. 1A, fiber optic diagnostic testing apparatus 102 may contain display 104. Display 104 may allow the display of one or more statuses, measurements, or other indicators. For example, display 104 may display an indicator of optical power of a signal received via one of the plurality of fiber optic connectors and detected by one or more photodetectors of fiber optic diagnostic testing apparatus 102. Optical power measurements of a received signal may be expressed in decibels (dB), dBm (the power ratio of decibels of the signal strength to one milliwatt), or in other units. Display 104 may display an indicator of a wavelength being measured including, but not limited to, 850 nanometers, 980 nanometers, 1300 nanometers, 1310 nanometers, and 1550 nanometers. Display 104 may also show other information, such as a loss or gain of a received signal strength from a stored reference signal strength, a variance of a received signal strength from a stored reference signal strength, the value of a stored reference signal strength, and a measurement of a battery level of fiber optic testing apparatus 102. Display 104 may be an LCD (Liquid Crystal Display) based display, an LEP (Light Emitting Polymer) based display, a OLED (Organic Light Emitting Diode) based display, or other display technology. According to one or more embodiments, display 104 may be a touchscreen. Display 104 may contain or be integrated with a protective cover, a protective film, a backlight, and other components.

The one or more user controls of fiber optic testing apparatus 102 may include controls allowing a user to perform one or more of: selecting a wavelength to be measured, calibrating the optical power measurement module, storing a reference measurement, clearing a reference measurement, powering on the apparatus, powering off the apparatus, and measuring a difference between a measured signal strength and a reference. User interface controls 106, 108, 110, 112, 114, and 116 may be pushbuttons according to some embodiments. According to one or more embodiments, user interface controls may be provided via slider controls, switches, dials, or other inputs. According to at least one embodiment, display 104 may be a touch screen display and one or more user controls may be incorporated in display 104.

Fiber optic testing apparatus 102 may include one or more indicators such as indicator 118. Indicators may be used to indicate statuses such as power (e.g., a green LED), a low battery (e.g., red or yellow LEDs), errors, and warnings (e.g., a blinking LED to indicate entry into a powersave mode or to indicate signal reception).

According to one or more embodiments, fiber optic testing apparatus 102 may contain one or more holders for securing covers which may be removed and placed over an end of a fiber optic connector. For example, fiber optic testing apparatus 102 may one or more slots of a width slightly greater than an outer peripheral rim of a connector dustcover. This may allow a connector dustcover to be slid into a slot for holding. In one or more embodiments, fiber optic testing apparatus 102 may contain one or more indentations allowing insertion of all or a portion of a dustcover to allow holding and removal of one or more dustcovers.

The various components of fiber optic testing apparatus 102 as shown in FIG. 1A may be further duplicated, combined and integrated to support various applications and platforms. Additional elements may also be implemented in the apparatus described above to support various applications.

Figure 1B:
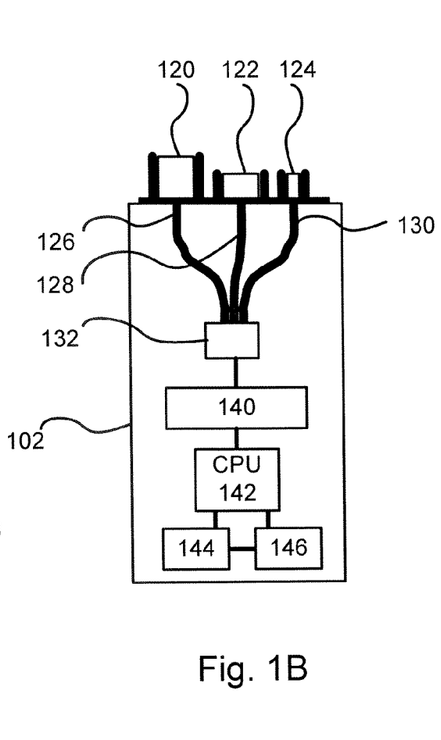
FIG. 1B is a schematic of a fiber optic diagnostic testing apparatus operatively connected to a plurality of fiber optic connectors, in accordance with an exemplary embodiment.

FIG. 1B is a schematic of a fiber optic diagnostic testing apparatus operatively connected to a plurality of fiber optic connectors, in accordance with an exemplary embodiment. Fiber optic connectors 120, 122, and 124 may be operatively connected via optical fibers 126, 128, and 130 to photodetector 132. Photodetector 132 may be operatively connected to optical power measurement module 140. Optical power measurement module 140 may be operatively connected to CPU 142. CPU 142 may be operatively connected to battery 144 and power supply and charger 146.

Photodetector 132 may comprise a photoresistor, a photodiode, a phototransistor, a photovoltaic cell, or other circuitry capable of converting light to either current or voltage. Photodetector 132 may convert light received via optical fibers 126, 128, and 130 to either current or voltage. The resulting current or voltage may be provided to optical power measurement module 140. Optical power measurement module 140 may use a voltmeter, an ammeter, or other circuitry to measure the light converted to current or voltage. Optical power measurement module 140 may provide measurements and data to CPU 142.

CPU 142 may be a microprocessor, a System on a Chip (Soc), an Application Specific Integrated Circuit (ASIC), a Complex Programmable Logic Device (CPLD), or other integrated circuit. CPU 142 may be operatively connected to battery 144 and power supply and charger 146. CPU 142 may contain or access logic to perform functionality such as, by way of non-limiting example, accepting user input specifying a wavelength to be measured, calibrating the optical power measurement module to a specified wavelength, storing a reference measurement, clearing a reference measurement, powering on the apparatus, powering off the apparatus, and measuring a difference between a measured signal strength and a reference, and other functionality.

Battery 144 may be a rechargeable battery connected to CPU 142 and power supply and charger 146. Power supply and charger 146 may be connectable to an external power source for charging and operation. Power supply and charger 146 may recharge battery 144 when connected to an external power source and may provide power management functionality for fiber optic testing apparatus 102.

Fiber optic testing apparatus 102 may include other components not illustrated including, but not limited to a display controller, memory, non-volatile storage, and one or more interfaces (e.g., a power port or electrical contacts for recharging and a Universal Serial Bus (USB) port).

Figure 1C:
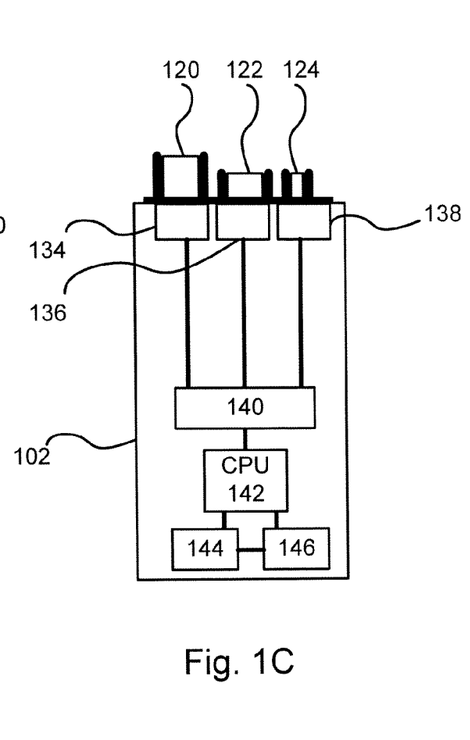
FIG. 1C is a schematic of a fiber optic diagnostic testing apparatus operatively connected to a plurality of fiber optic connectors, in accordance with an alternate exemplary embodiment.

FIG. 1C is a schematic of a fiber optic diagnostic testing apparatus operatively connected to a plurality of fiber optic connectors, in accordance with an alternate exemplary embodiment. As discussed above with reference to FIG. 1B, fiber optic testing apparatus 102 may contain fiber optic connectors 120, 122, and 124. Fiber optic testing apparatus 102 may also contain optical power measurement module 140 which may be operatively connected to CPU 142. CPU 142 may be operatively connected to battery 144 and power supply and charger 146.

As illustrated in FIG. 1C, fiber optic testing apparatus 102 may contain a plurality of photodetectors, such as photodetectors 134, 136, and 138. Photodetectors 134, 136, and 138 may be operatively connected to fiber optic connectors 120, 122, and 124 respectively. Photodetectors 134, 136, and 138 may comprise photoresistors, photodiodes, phototransistors, or photovoltaic cells, or other circuitry capable of converting light to either current or voltage for measurement. The resulting current or voltage may be provided to optical power measurement module 140. Optical power measurement module 140 may use a voltmeter, an ammeter, or other circuitry to measure the light converted to current or voltage. Optical power measurement module 140 may provide measurements and data to CPU 142.

Figure 2A:
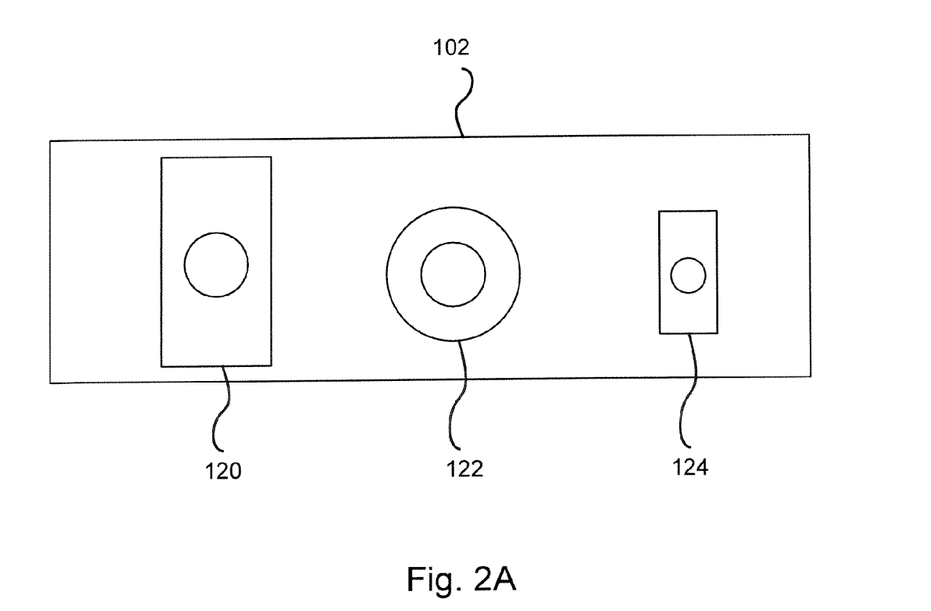
FIG. 2A depicts an end view of a fiber optic diagnostic testing apparatus operatively connected to a plurality of fiber optic connectors, in accordance with an exemplary embodiment.

FIG. 2A depicts an end view of a fiber optic diagnostic testing apparatus operatively connected to a plurality of fiber optic connectors, in accordance with an exemplary embodiment. As illustrated in FIG. 2A, fiber optic connectors 120, 122, and 124 may have different dimensions and may use different methods of mechanical coupling. For example, as discussed above with reference to FIG. 1A, fiber optic connector 122 may be a Standard Connector, fiber optic connector 124 may be a Ferrule Connector, and fiber optic connector 122 may be a Local Connector. Other standards or specifications for fiber connectors may be utilized. Although illustrated as containing three fiber optic connectors in FIGS. 1A, 1B, 1C and 2, greater or fewer numbers may be used in a fiber optic testing apparatus. According to one or more embodiments, fiber optic connectors 120, 122, and 124 may be located on a top side of fiber optic testing apparatus 102. According to some embodiments, fiber optic connectors may be located on other surfaces of fiber optic testing apparatus 102 such as a bottom end, a side, the back surface, or the front surface.

Figure 2B:
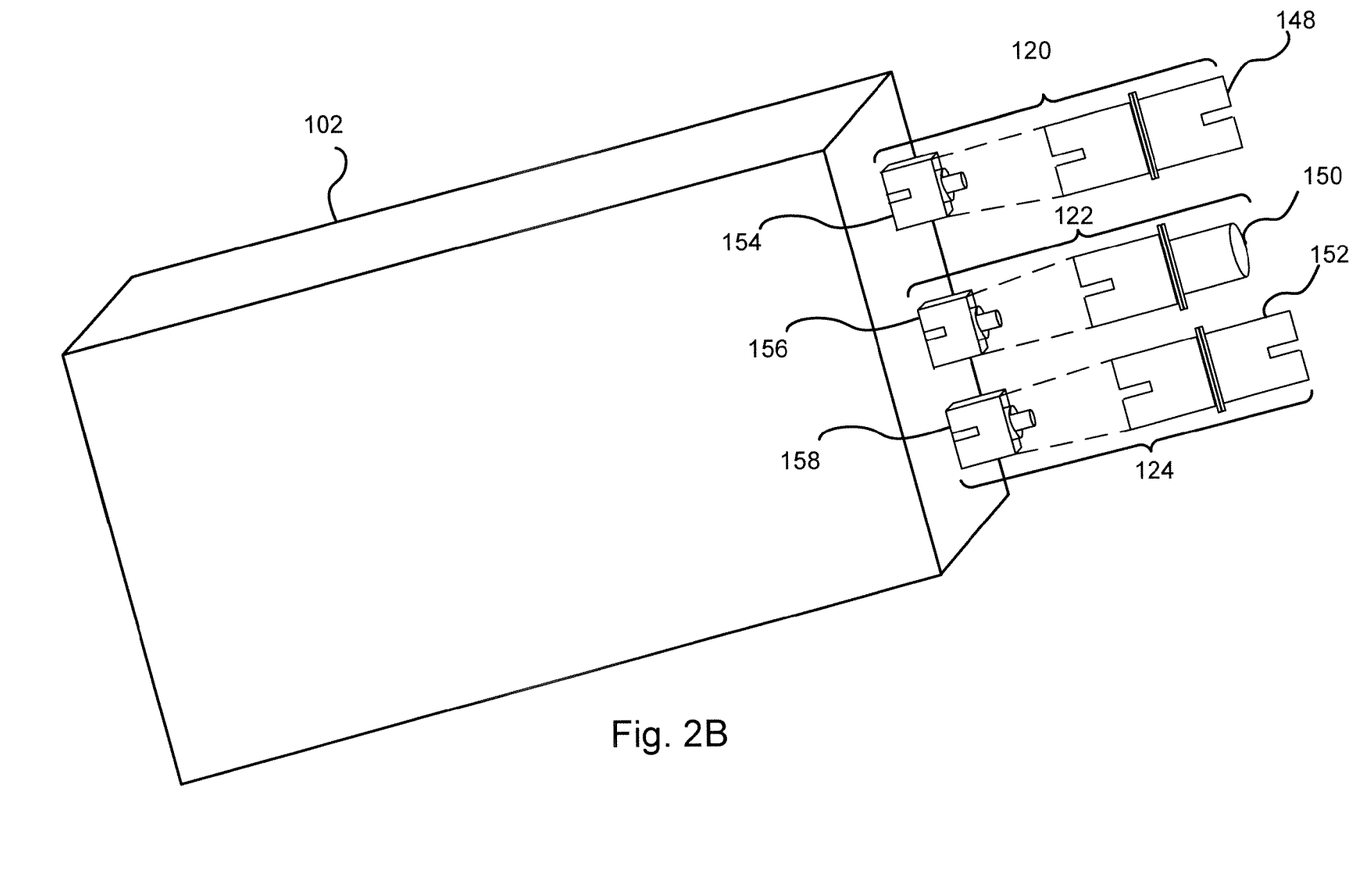
FIG. 2B depicts an back view of a fiber optic diagnostic testing apparatus operatively connected to a plurality of fiber optic connectors, in accordance with an exemplary embodiment.

As illustrated in FIG. 2B, fiber optic connectors 120, 122, and 124 may each be comprised of several components. According to some embodiments, a first component may be fixed component which may be an SC connector, an FC connector, an LC connector, another industry connector, or a proprietary connector. Connector components may provide male or female interfaces. For example, connector components 154, 156, and 158 may be male SC connectors. Connector components 154, 156, and 158 may be capable of operatively coupling with one or more connector adaptors. Connector adaptors 148, 150, and 152 may operatively couple with connectors components 154, 156, and 158. A first end of a connector adaptor may fasten to a connector component using a proprietary interface or an industry standard interface (e.g., SC, FC, LC, etc.) and a distal end may provide an industry standard interface connector for fastening to a fiber optic cable or port. For example, connector component 154 may be a male SC connector. Connector component 154 may operatively couple to connector adaptor 148. A first end of connector adaptor 148 may provide a female SC interface for operatively coupling with connector component 154. A second end of connector adaptor 148 may provide a second interface such as one of a FC female interface, a FC male interface, a LC female Interface, a LC male interface, a SC female interface, or another fiber optic interface.

Connector adaptors 148, 150, and 152 may securely fasten to connector components 154, 156, and 158, but may be removable. Connector adaptors 148, 150, and 152 may use a snap interface, a screw interface, a push-pull connector, a clamp, or another mechanism for fastening. According to some embodiments, if an interface provided by a connector component such as, for example, connector components 154, 156, and 158, is the desired interface, a fiber optic cable or port may be connected directly to the connector component without the use of a connector adaptor.

According to some embodiments, connectors components 154, 156, and 158 may use a same interface standard such as SC male. Connector adaptors 148, 150, and 152 may contain a same interface standard on one end, such as SC female. Connector adaptors 148, 150, and 152 may use different interface standards on a second end. This may allow connector adaptors 148, 150, and 152 to couple with any of connectors components 154, 156, and 158. The plurality of interfaces on a second end may allow a fiber optic diagnostic testing apparatus to contain a plurality of different operable interfaces for testing fiber optic cables. The removable connector adaptors may provide additional flexibility to accommodate new interface standards and to change a fiber interface for a testing need.

Figure 3A:
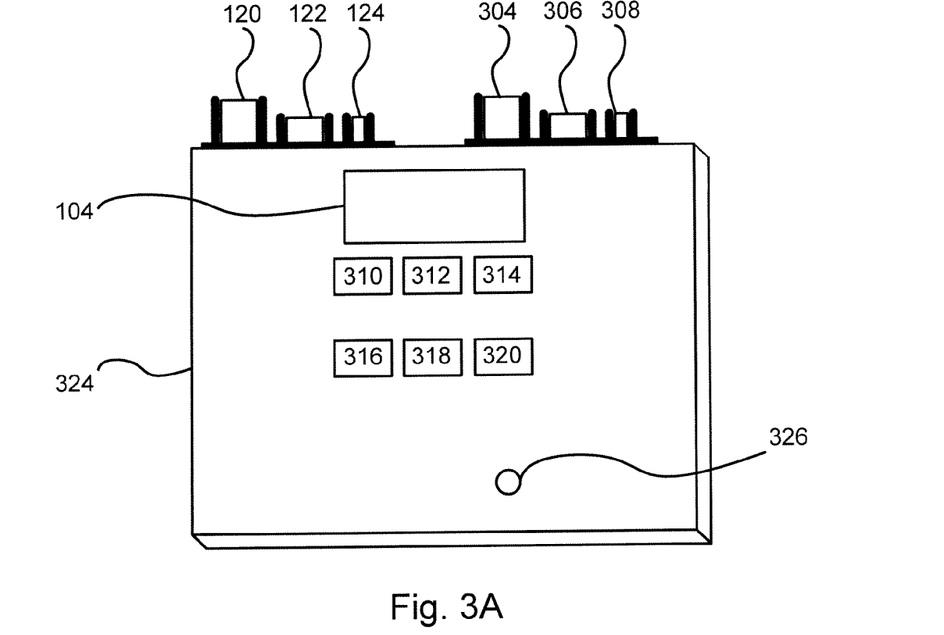
FIG. 3A depicts a fiber optic diagnostic testing apparatus operatively connected to a plurality of fiber optic connectors and a light source, in accordance with an exemplary embodiment.

FIG. 3A depicts a fiber optic diagnostic testing apparatus operatively connected to a plurality of fiber optic connectors and a light source, in accordance with an exemplary embodiment. As illustrated in FIG. 3A, fiber optic diagnostic testing apparatus 324 may contain a plurality of fiber optic connectors for coupling to fiber optic cables such as, by way of non-limiting example, connectors 120, 122, 124, 304, 306, and 308. Fiber optic diagnostic testing apparatus 324 may include one or more displays such as display 104. Fiber optic diagnostic testing apparatus 324 may include one or a plurality of user interface controls such as user interface controls 310, 312, 314, 316, 318, and 320. Fiber optic diagnostic testing apparatus 324 may contain one or more indicators, such as indicator 326.

Fiber optic connectors 120, 122, 124, 304, 306, and 308 may comprise fiber optic connectors complying with different standards. For example, fiber optic connectors 120 and 304 may be Standard Connectors which may comply with a standard such as IEC 61754-4. Fiber optic connectors 122 and 306 may be Ferrule Connectors which may comply with a standard such as IEC 61754-13. Fiber optic connectors 124 and 308 may be Local Connectors which may comply with a standard such as IEC 61754-20. Other standards or specifications for fiber connectors may be utilized. Fiber optic connectors 120, 122, and 124 may be capable of securely fastening to and detaching from fiber optic cables to allow fiber optic diagnostic testing apparatus 102 to operatively connect to fiber optic cables of different standards. As described in further detail with reference to FIG. 3B, fiber optic connectors 120, 122, and 124 may be connectors capable of coupling to fiber optic cables to receive optical signals. Fiber optic connectors 304, 306, and 308 may be connectors capable of coupling to fiber optic cables to transmit signals. For example, fiber optic connectors 304, 306, and 308 may allow transmission of a signal at 850 nanometers, 980 nanometers, 1300 nanometers, 1310 nanometers, 1550 nanometers, or at another specified wavelength. As described in greater detail in reference to FIG. 2B above, fiber optic connectors 120, 122, and 124 may comprise a plurality of components which may allow the interface type to be quickly and easily changed. Similarly, fiber optic connectors 304, 306, and 308 may also be comprised of a plurality of components allowing the changing of an interface type.

The one or more user controls of fiber optic testing apparatus 324 may include controls allowing a user to perform one or more of: selecting a wavelength to be measured, calibrating the optical power measurement module, storing a reference measurement, clearing a reference measurement, powering on the apparatus, powering off the apparatus, and measuring a difference between a measured signal strength and a reference. User interface controls may also allow a user to select a desired wavelength to transmit. User interface controls may further allow a user to modulate a transmitted signal.

User interface controls 310, 312, 314, 316, 318, 320 may be pushbuttons according to some embodiments. According to one or more embodiments, user interface controls may be provided via slider controls, switches, dials, or other inputs. According to at least one embodiment, display 104 may be a touch screen display and one or more user controls may be incorporated in display 104.

In addition to functionality discussed above in reference to FIG. 1A, display 104 may display an indictor that fiber optic testing apparatus 324 is transmitting a signal, an indicator that fiber optic testing apparatus 324 is transmitting at a particular wavelength, or other indicators. In one or more embodiments, fiber optic testing apparatus 324 may contain a plurality of displays such as a display associated with signal receiving functionality and a display associated with signal transmission functionality. According to some embodiments, fiber optic testing apparatus 324 may be capable of measuring received signals and transmitting signals concurrently. In such embodiments, display 104 may display concurrently information associated with signal reception and signal transmission.

Fiber optic testing apparatus 324 may include one or more indicators such as indicator 326. Indicators may be used to indicate statuses such as power (e.g., a green LED), a low battery (e.g., red or yellow LEDs), errors, and warnings (e.g., a blinking LED to indicate entry into a powersave mode). Different colors or patterns of display (e.g., blinking or strobing) may indicate different device states such as receiving data or transmitting data.

Figure 3B:
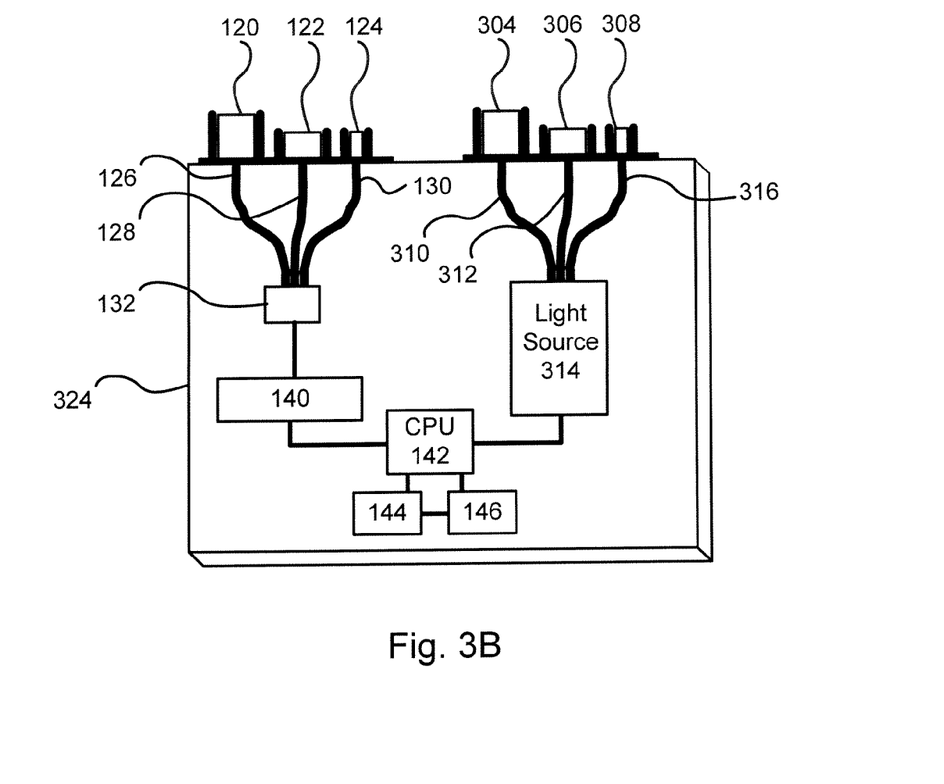
FIG. 3B is a schematic of a fiber optic diagnostic testing apparatus operatively connected to a plurality of fiber optic connectors and a light source, in accordance with an exemplary embodiment.

FIG. 3B is a schematic of a fiber optic diagnostic testing apparatus operatively connected to a plurality of fiber optic connectors and a light source, in accordance with an exemplary embodiment. As discussed above with reference to FIGS. 1B and 1C, embodiments of a fiber optic testing apparatus may contain fiber optic connectors 120, 122, and 124, which may be operatively connected via optical fibers 126, 128, and 130 to photodetector 132. Embodiments of a fiber optic testing apparatus may also contain optical power measurement module 140 which may be operatively connected to CPU 142. CPU 142 may be operatively connected to battery 144 and power supply and charger 146. As illustrated in FIG. 3B, fiber optic testing apparatus 324 may also contain fiber optic connectors 304, 306, and 308 which may be operatively connected via fiber optic cables 310, 312, and 316 to light source 314. Light source 314 may be operatively connected to CPU 142.

Light source 314 may be a Light Emitting Diode (LED), a laser, a laser diode, or other light source. Light source 314 may be calibrated to emit light at a particular wavelength such as 850 nanometers, 980 nanometers, 1300 nanometers, 1310 nanometers, 1550 nanometers, or at another specified wavelength. Light source 314 may be operatively connected to CPU 142 and CPU 142 may control light source 314. CPU 142 may power on or power off light source 314 in response to user input accepted from one or more user controls. According to some embodiments, light source 314 may be modulated. Sending a modulated signal on a fiber optic cable may allow a technician or other person at a remote location to identify the correct cable to test. Modulation of a light source may occur whenever a light source is powered on or may occur in response to user input specifying modulation of the light source. According to one or more embodiments CPU 142 may perform a power save routine which may power down a light source, a display, other components, or an entire fiber optic testing apparatus, such as fiber optic testing apparatus 324. The power save routine may be based on a specified timeout since one or more indicators of user activity have been received (e.g., a specified length of time since the last user input).

Although FIG. 3B depicts fiber optic testing apparatus 324 as having a single photodetector according to one or more embodiments fiber optic testing apparatus 324 may contain a plurality of photodetectors. For example, fiber optic connectors 120, 122, and 124 may each be connected to separate photodetectors. Each individual photodetector may be operatively connected to optical power measurement module 140.

Figure 4A:
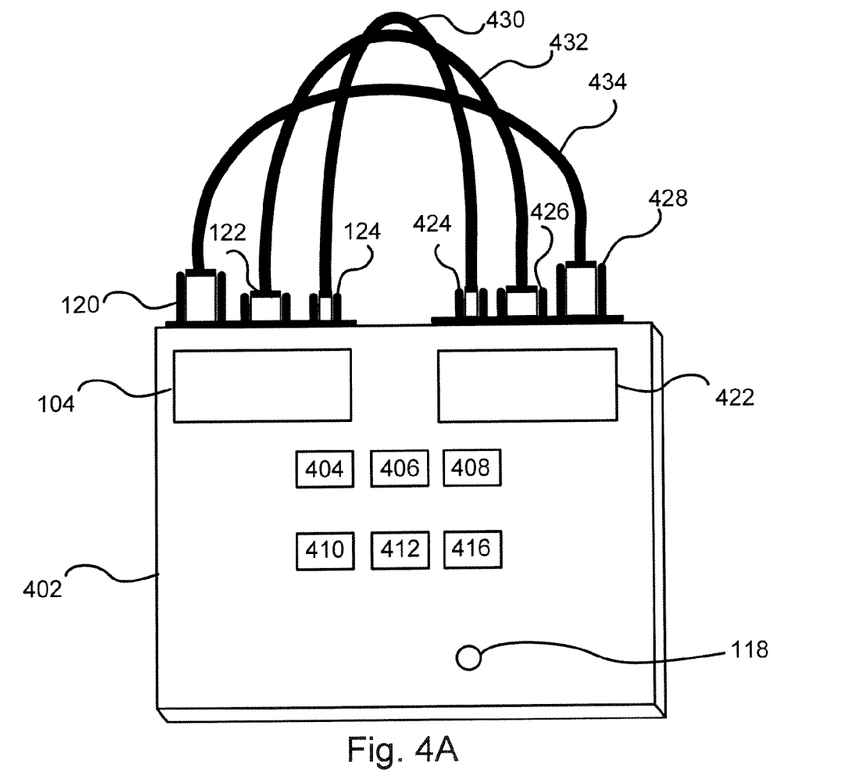
FIG. 4A depicts a fiber optic diagnostic testing apparatus operatively connected to multiple sets of fiber optic connectors, in accordance with an exemplary embodiment.

FIG. 4A depicts a fiber optic diagnostic testing apparatus operatively connected to multiple sets of fiber optic connectors, in accordance with an exemplary embodiment. As illustrated in FIG. 4A, fiber optic diagnostic testing apparatus 402 may contain a plurality of fiber optic connectors for coupling to fiber optic cables such as, by way of non-limiting example, connectors 120, 122, 124, 424, 426, and 428. Fiber optic diagnostic testing apparatus 402 may include one or more displays such as displays 104 and 422. Fiber optic diagnostic testing apparatus 402 may include one or a plurality of user interface controls such as user interface controls 404, 406, 408, 410, 412, and 416. Fiber optic diagnostic testing apparatus 402 may contain one or more indicators, such as indicator 118. According to some embodiments, fiber optic diagnostic testing apparatus 402 may include a plurality of fiber optic cables, such as cables 430, 432, and 434.

Fiber optic connectors 120, 122, 124, 424, 426, and 428 may comprise fiber optic connectors complying with different standards. For example, fiber optic connectors 120 and 424 may be Standard Connectors which may comply with a standard such as IEC 61754-4. Fiber optic connectors 122 and 426 may be Ferrule Connectors which may comply with a standard such as IEC 61754-13. Fiber optic connectors 124 and 428 may be Local Connectors which may comply with a standard such as IEC 61754-20. Other standards or specifications for fiber connectors may be utilized. Fiber optic connectors 120, 122, 124, 424, 426, and 428 may be capable of securely fastening to and detaching from fiber optic cables to allow fiber optic diagnostic testing apparatus 402 to operatively connect to fiber optic cables of different standards. As described in greater detail in reference to FIG. 2B above, fiber optic connectors 120, 122, and 124 may comprise a plurality of components which may allow the interface type to be quickly and easily changed. Similarly, fiber optic connectors 424, 426, and 428 may also be comprised of a plurality of components allowing the changing of an interface type.

The cables of fiber optic testing apparatus 402 may fasten between two fiber optic connectors for storage and transport and may protect the fiber optic connectors from dirt and contamination. The cables may also be used as patch cords to operatively connect one or more fiber optic connectors of fiber optic testing apparatus 402 to fiber optic equipment including, but not limited to, cross connections, an add-drop multiplexer, an optical switch, a workstation or other equipment. For example, a technician may unplug a cable being tested from a cross connect and may not know whether the cable is transmitting or receiving a signal. The technician may unplug a cable from a fiber optic connector of fiber optic testing apparatus 402 that corresponds to the proper standard and may connect the cable under test to the fiber optic connector. For example, the cable under test may use a SC connector and the technician may unplug cable 434 from fiber optic connector 120. The technician may then connect the cable under test to fiber optic connector 120. The technician may also connect cable 434 to the port or connector on the cross connect or other optical communications equipment that the cable under test was removed from. Thus, the optical communications equipment which was hooked to the cable under test may now be connected via cable 434 to fiber optic connector 428. If the fiber optic cable under test is receiving a signal, fiber optic testing apparatus 402 may display a measured signal strength on display 104. If the fiber optic cable under test was transmitting a signal received from the optical communications equipment, fiber optic testing apparatus 402 may display a measured signal strength on display 422 of a signal received via cable 434. The multiple fiber optics connectors of fiber optic testing apparatus 402 may allow a user to connect to both a cable being tested and equipment associated with the cable simultaneously to determine the direction and strength of an optical signal.

The one or more user controls of fiber optic testing apparatus 402 may include controls allowing a user to perform one or more of: selecting a wavelength to be measured, calibrating the optical power measurement module, storing a reference measurement, clearing a reference measurement, powering on the apparatus, powering off the apparatus, and measuring a difference between a measured signal strength and a reference.

Figure 4B:
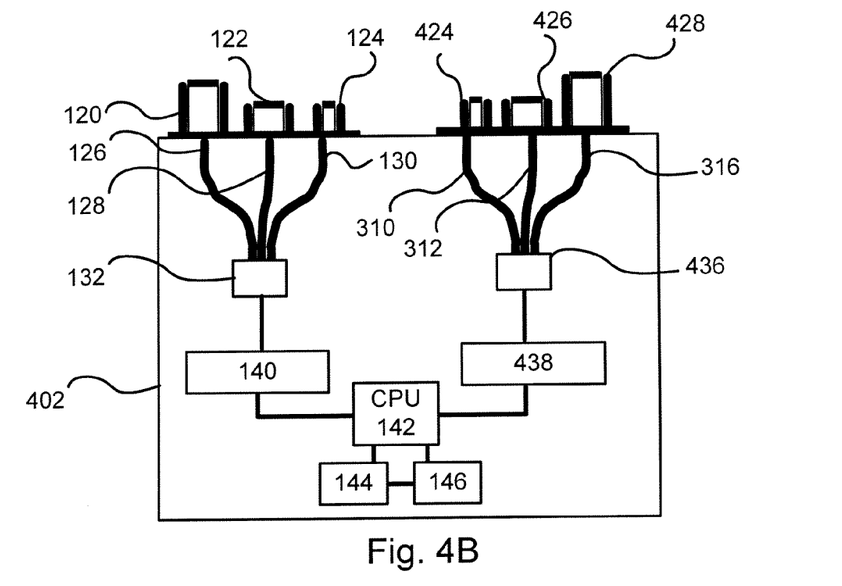
FIG. 4B is a schematic of a fiber optic diagnostic testing apparatus operatively connected to multiple sets of fiber optic connectors, in accordance with an exemplary embodiment.

FIG. 4B is a schematic of a fiber optic diagnostic testing apparatus operatively connected to multiple sets of fiber optic connectors, in accordance with an exemplary embodiment. As discussed above with reference to FIGS. 1B and 1C, embodiments of a fiber optic testing apparatus may contain fiber optic connectors 120, 122, and 124, which may be operatively connected via optical fibers 126, 128, and 130 to photodetector 132. Embodiments of a fiber optic testing apparatus may also contain optical power measurement module 140 which may be operatively connected to CPU 142. CPU 142 may be operatively connected to battery 144 and power supply and charger 146. As illustrated in FIG. 4B, fiber optic testing apparatus 402 may also contain fiber optic connectors 424, 426, and 428, which may be operatively connected via optical fibers 310, 312, and 316 to photodetector 436. Photodetector 436 may be operatively connected to optical power measurement module 438. Optical power measurement module 438 may be operatively connected to CPU 142. Photodetector 436 may be similar in construction and function to photodetector 132 as described above. Optical power measurement module 438 may be similar in construction and function to optical power measurement module 140 as described above. CPU 142 may receive optical power measurement data from optical power measurement module 140 and may display related information on display 104. CPU 142 may receive optical power measurement data from optical power measurement module 438 and may display related information on display 422.

Although FIG. 4B depicts fiber optic testing apparatus 402 as having a single photodetector according to one or more embodiments fiber optic testing apparatus 402 may contain a plurality of photodetectors. For example, fiber optic connectors 120, 122, 124, 424, 426, and 428 may each be connected to separate photodetectors. Each individual photodetector may be operatively connected to optical power measurement modules 140 and 438 via optical fibers.

Figure 5A:
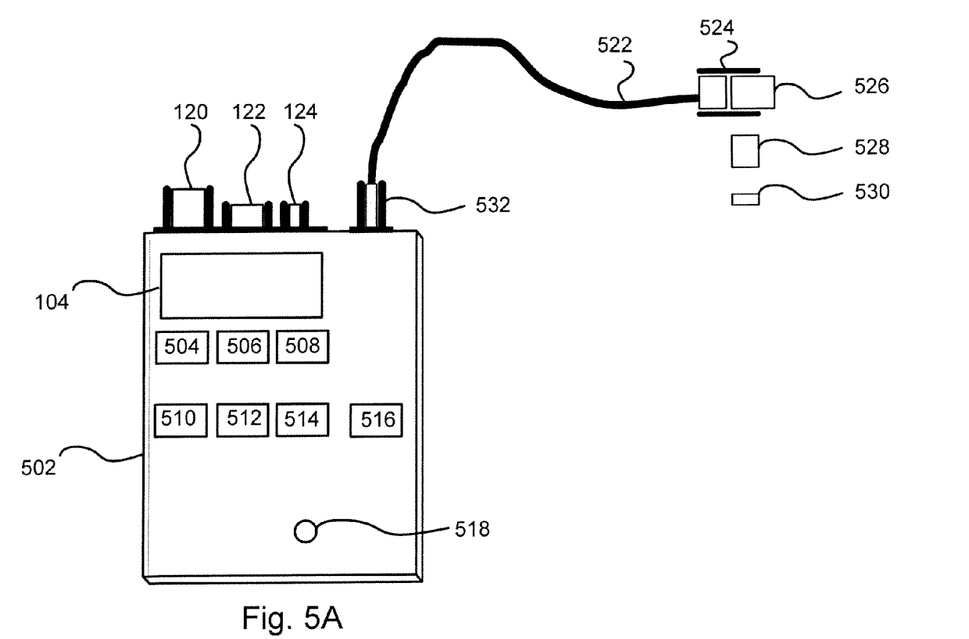
FIG. 5A is a diagram of a fiber optic diagnostic testing apparatus operatively connected to a plurality of fiber optic connectors and a light source, in accordance with an exemplary embodiment.

FIG. 5A is a diagram of a fiber optic diagnostic testing apparatus operatively connected to a plurality of fiber optic connectors and a light source, in accordance with an exemplary embodiment. FIG. 5A depicts a fiber optic diagnostic testing apparatus operatively connected to a plurality of fiber optic connectors and a light source, in accordance with an exemplary embodiment. As discussed above with reference to FIG. 1A, embodiments of a fiber optic testing apparatus may contain a plurality of fiber optic connectors for coupling to fiber optic cables such as, by way of non-limiting example, connectors 120, 122, and 124. As described in greater detail in reference to FIG. 2B above, fiber optic connectors 120, 122, and 124 may comprise a plurality of components which may allow the interface type to be quickly and easily changed.

Fiber optic diagnostic testing apparatus 502 may include one or more displays such as display 104. Fiber optic diagnostic testing apparatus 502 may also include one or a plurality of user interface controls such as user interface controls 504, 506, 508, 510, 512, and 514. Fiber optic diagnostic testing apparatus 502 may contain one or more indicators, such as indicator 518. As illustrated in FIG. 5A, fiber optic testing apparatus 502 may also contain fiber optic connector 532 which may be operatively connected to cable 522 and connector adaptor 524. Connector adaptor 524 may allow the secure fastening and removal of one or more fiber optic connectors including, but not limited to fiber optic connectors 526, 528 and 530.

Fiber optic connector 532, 526, 528 and 530 may comprise fiber optic connectors complying with different standards. For example, fiber optic connector 526 may be a Standard Connector which may comply with a standard such as IEC 61754-4. Fiber optic connector 528 may be Ferrule Connectors which may comply with a standard such as IEC 61754-13. Fiber optic connectors 530 may be Local Connectors which may comply with a standard such as IEC 61754-20. Other standards or specifications for fiber connectors may be utilized. As described in further detail with reference to FIG. 5B, fiber optic connectors 526, 528 and 530 may be connectors capable of coupling to fiber optic cables to transmit optical light or signals. Fiber optic diagnostic testing apparatus 502 may contain one or more slots or openings for storing fiber optic connectors 526, 528 and 530 when not in use. According to some embodiments, a visible light source may be used which may allow connection to a cable for cable tracing or fault identification. According to one or more embodiments, connector adaptor 524 may be capable of accepting a lense as an attachment which may allow transmitted visible light to be used as a flashlight.

The one or more user controls of fiber optic testing apparatus 502 may include controls allowing a user to perform one or more of: selecting a wavelength to be measured, calibrating the optical power measurement module, storing a reference measurement, clearing a reference measurement, powering on the apparatus, powering off the apparatus, and measuring a difference between a measured signal strength and a reference. User interface controls may allow a user to select a desired wavelength to transmit, to start transmission of a signal, to modulate signal transmission, and to stop signal transmission.

User interface controls 504, 506, 508, 510, 512, 514, and 516 may be pushbuttons according to some embodiments. According to one or more embodiments, user interface controls may be provided via slider controls, switches, dials, or other inputs. According to at least one embodiment, display 104 may be a touch screen display and one or more user controls may be incorporated in display 104.

Figure 5B:
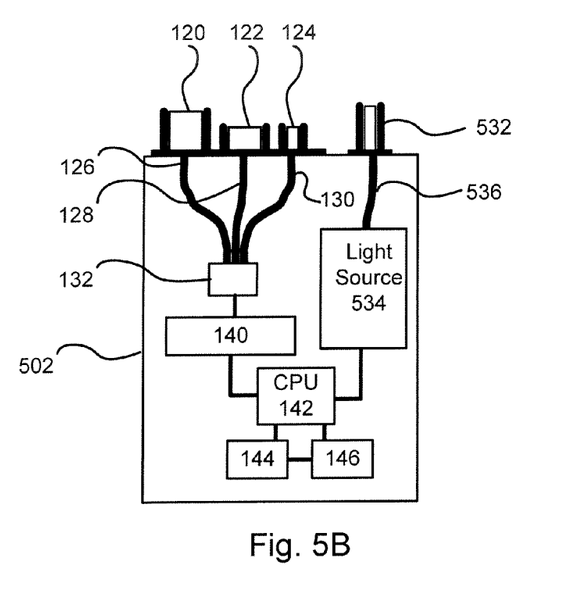
FIG. 5B is a schematic of a fiber optic diagnostic testing apparatus operatively connected to a plurality of fiber optic connectors and a light source, in accordance with an exemplary embodiment.

FIG. 5B is a schematic of a fiber optic diagnostic testing apparatus operatively connected to a plurality of fiber optic connectors and a light source, in accordance with an exemplary embodiment. As discussed above with reference to FIGS. 1B and 1C, embodiments of a fiber optic testing apparatus may contain fiber optic connectors 120, 122, and 124, which may be operatively connected via optical fibers 126, 128, and 130 to photodetector 132. Embodiments of a fiber optic testing apparatus may also contain optical power measurement module 140 which may be operatively connected to CPU 142. CPU 142 may be operatively connected to battery 144 and power supply and charger 146. As illustrated in FIG. 5B, fiber optic testing apparatus 502 may also contain fiber optic connector 532, fiber optic cable 536, and light source 534.

Light source 534 may be a visible light source including but not limited to a Light Emitting Diode (LED), a laser, a laser diode, or other light source. According to some embodiments, light source 534 may be calibrated to emit light at a particular wavelength such as 850 nanometers, 980 nanometers, 1300 nanometers, 1310 nanometers, 1550 nanometers, or at another specified wavelength. Light source 534 may be operatively connected to CPU 142 and CPU 142 may control light source 534. CPU 142 may power on or power off light source 534 in response to user input accepted from one or more user controls. According to some embodiments, light source 534 may be modulated. According to one or more embodiments CPU 142 may perform a power save routine which may power down a light source, a display, other components, or an entire fiber optic testing apparatus, such as fiber optic testing apparatus 502. The power save routine may be based on a specified timeout since one or more indicators of user activity have been received (e.g., a specified length of time since the last user input such as for example five minutes).

Although FIG. 5B depicts fiber optic testing apparatus 502 as having a single photodetector according to one or more embodiments fiber optic testing apparatus 502 may contain a plurality of photodetectors. For example, fiber optic connectors 120, 122, and 124 may each be connected to separate photodetectors. Each individual photodetector may be operatively connected to optical power measurement module 140 via optical fibers.

Figure 6A:
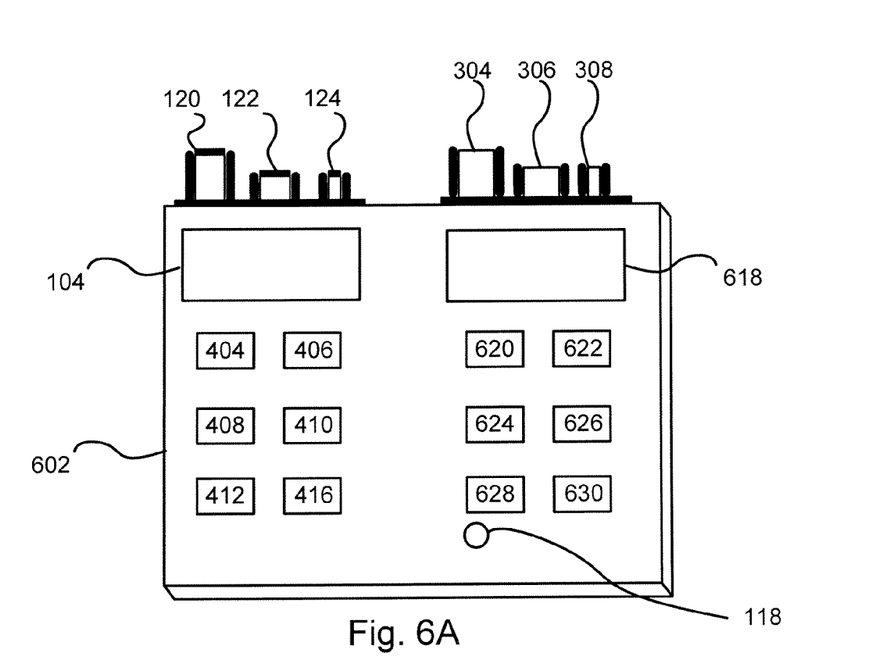
FIG. 6A is a diagram of a fiber optic diagnostic testing apparatus operatively connected to a plurality of fiber optic connectors and a plurality of light sources, in accordance with an exemplary embodiment.

FIG. 6A depicts a fiber optic diagnostic testing apparatus operatively connected to multiple sets of fiber optic connectors, in accordance with an exemplary embodiment. As illustrated in FIG. 6A, fiber optic diagnostic testing apparatus 602 may contain a plurality of fiber optic connectors for coupling to fiber optic cables such as, by way of non-limiting example, connectors 120, 122, 124, 304, 306, and 308. Fiber optic diagnostic testing apparatus 602 may include one or more displays such as displays 104 and 618. Fiber optic diagnostic testing apparatus 602 may include one or a plurality of user interface controls such as user interface controls 404, 406, 408, 410, 412, 416, 620, 622, 624, 626, 628, and 630. Fiber optic diagnostic testing apparatus 602 may contain one or more indicators, such as indicator 118.

Fiber optic connectors 120, 122, 124, 304, 306, and 308 may comprise fiber optic connectors complying with different standards. For example, fiber optic connectors 120 and 304 may be a Standard Connectors which may comply with a standard such as IEC 61754-4. Fiber optic connectors 122 and 306 may be Ferrule Connectors which may comply with a standard such as IEC 61754-13. Fiber optic connectors 124 and 308 may be Local Connectors which may comply with a standard such as IEC 61754-20. Other standards or specifications for fiber connectors may be utilized. Fiber optic connectors 120, 122, 124, 304, 306, and 308 may be capable of securely fastening to and detaching from fiber optic cables to allow fiber optic diagnostic testing apparatus 402 to operatively connect to fiber optic cables of different standards. As described in greater detail in reference to FIG. 2B above, fiber optic connectors 120, 122, and 124 may comprise a plurality of components which may allow the interface type to be quickly and easily changed. Similarly, fiber optic connectors 304, 306, and 308 may also be comprised of a plurality of components allowing the changing of an interface type.

The one or more user controls of fiber optic testing apparatus 602 may include controls allowing a user to perform one or more of: selecting a wavelength to be measured, calibrating the optical power measurement module, storing a reference measurement, clearing a reference measurement, powering on the apparatus, powering off the apparatus, and measuring a difference between a measured signal strength and a reference. The controls may also allow a user to specify a light source to use. According to one or more embodiments, there may be two sets of controls. A first set of controls may be aligned under display 104 and may be associated with measuring received signals. A second set of controls may be aligned under display 618 and may be associated with transmitting different signals. Display 618 may display the signal strength being transmitted, a light source selected, light sources available and other testing information. The one or more user controls of fiber optic testing apparatus 602 may allow a user to select from a plurality of light sources. Light sources may be calibrated to emit light at a particular wavelength such as 850 nanometers, 980 nanometers, 1300 nanometers, 1310 nanometers, 1550 nanometers, or at another specified wavelength.

Figure 6B:
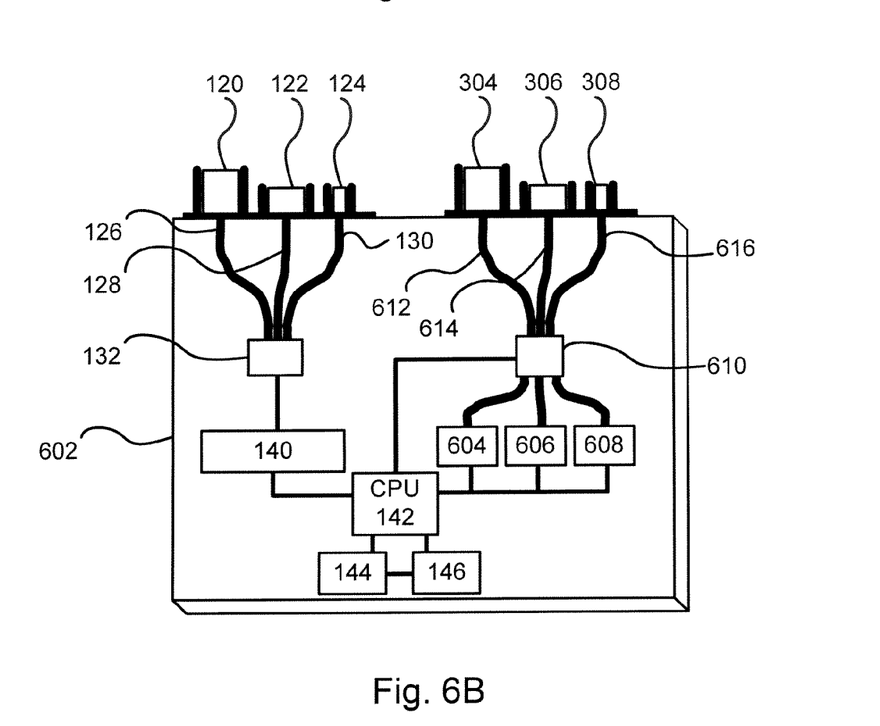
FIG. 6B is a schematic of a fiber optic diagnostic testing apparatus operatively connected to a plurality of fiber optic connectors and a plurality of light sources, in accordance with an exemplary embodiment.

FIG. 6B is a schematic of a fiber optic diagnostic testing apparatus operatively connected to a plurality of fiber optic connectors and a plurality of light sources, in accordance with an exemplary embodiment. As discussed above with reference to FIGS. 1B and 1C, embodiments of a fiber optic testing apparatus may contain fiber optic connectors 120, 122, and 124, which may be operatively connected via optical fibers 126, 128, and 130 to photodetector 132. Embodiments of a fiber optic testing apparatus may also contain optical power measurement module 140 which may be operatively connected to CPU 142. CPU 142 may be operatively connected to battery 144 and power supply and charger 146. As illustrated in FIG. 6B, fiber optic testing apparatus 602 may also contain fiber optic connectors 304, 306, and 308 which may be operatively connected via optical fibers 612, 614, and 616 to optical coupler 610. Optical coupler 610 may operatively connected to light sources 604, 606, and 608. Optical coupler 610 may operatively connected to CPU 142.

Optical coupler 610 may be an optocoupler, an optical switch, an optical splitter, or other circuitry permitting connectivity between light sources 604, 606, and 608 and fiber optic connectors 304, 306, and 308. According to one or more embodiments, optical coupler 610 may be operatively connected to CPU 142 which may allow CPU 142 to control the routing of a light source to a particular fiber optic connector via optical fibers 612, 614, and 616.

Light sources 604, 606, and 608 may be a Light Emitting Diode (LED), a laser, a laser diode, or other light source. Light sources 604, 606, and 608 may be calibrated to emit light at a particular wavelength such as 850 nanometers, 980 nanometers, 1300 nanometers, 1310 nanometers, 1550 nanometers, or at another specified wavelength. According to some embodiments, each light source may be calibrated to a different wavelength. By way of non-limiting example, light source 604 may be calibrated to transmit at 850 nanometers, light source 606 may be calibrated to transmit at 1300 nanometers, and light source 608 may be calibrated to transmit at 1500 nanometers. Light sources 604, 606, and 608 may be operatively connected to CPU 142 and CPU 142 may control light sources 604, 606, and 608. CPU 142 may power on or power off light sources 604, 606, and 608 in response to user input accepted from one or more user controls. According to some embodiments, light sources 604, 606, and 608 may be modulated. According to one or more embodiments CPU 142 may perform a power save routine which may power down a light source, a display, other components, or an entire fiber optic testing apparatus, such as fiber optic testing apparatus 602. The power save routine may be based on a specified timeout since one or more indicators of user activity have been received (e.g., a specified length of time since the last user input).

Although FIG. 6B depicts fiber optic testing apparatus 602 as having a single photodetector according to one or more embodiments fiber optic testing apparatus 602 may contain a plurality of photodetectors. For example, fiber optic connectors 120, 122, and 124 may each be connected to separate photodetectors. Each individual photodetector may be operatively connected to optical power measurement module 140.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An apparatus for optical fiber testing comprising:
   a plurality of fiber optic connectors each capable of coupling to a fiber optic cable, wherein the plurality of fiber optic connectors comprise fiber optic connectors complying with different standards;
   one or more photodetectors operatively connected to the plurality of fiber optic connectors;
   an optical power measurement module configured to measure optical power of the fiber optic cable, the optical power measurement module operatively connected to the one or more photodetectors;
   a display configured to display information received from the optical power measurement module;
   one or more user controls configured to accept user input;
   a fiber optic cable operatively connected to at least one of the plurality of fiber optic connectors, wherein the fiber optic cable allows at least one fiber optic connector to be operatively connected to a piece of fiber optic equipment.

2. The apparatus of claim 1, wherein the standards comprise at least one of: IEC 61754-13, IEC 61754-20, and IEC 61754-4.

3. The apparatus of claim 1, wherein each of the plurality of fiber optic connectors is operatively connected to a photodetector dedicated to a respective fiber optic connector.

4. The apparatus of claim 1, wherein the plurality of fiber optic connectors is operatively connected to a single photodetector via a fiber optic connection between each connector and the photodetector.

5. The apparatus of claim 1, wherein the display contains an indicator of optical power of a signal received via one of the plurality of fiber optic connectors and detected by one of the one or more photodetectors.

6. The apparatus of claim 1, wherein the display contains an indicator of a wavelength being measured.

7. The apparatus of claim 1, wherein the one or more user controls comprise controls allowing a user to perform at least one of the following:
   select a wavelength to be measured, calibrate the optical power measurement module, store a reference measurement, clear a reference measurement, power on the apparatus, power off the apparatus, and measure a variance from a reference.

8. The apparatus of claim 1, wherein the display contains an indicator of a measurement of variance of a received signal strength from stored reference signal strength.

9. The apparatus of claim 1, wherein the photodetector comprises at least one of: a photoresistor, a photodiode, a phototransistor, or a photovoltaic cell.

10. An apparatus for optical fiber testing comprising:
    a plurality of receiving fiber optic connectors each capable of coupling to a fiber optic cable, wherein the plurality of receiving fiber optic connectors comprise fiber optic connectors complying with different standards;
    one or more photodetectors operatively connected to the plurality of fiber optic connectors;
    an optical power measurement module configured to measure optical power of the fiber optic cable, the optical power measurement module operatively connected to the one or more photodetectors;
    a display;
    one or more user controls configured to accept user input; and
    one or more transmitting fiber optic connectors each capable of coupling to a fiber optic cable;
    one or more optical light sources operatively connected to the one or more transmitting fiber optic connectors; and
    an optical connector adaptor operatively connected to the one or more light sources, the optical connector adaptor comprising a fiber optic cable attached to the apparatus at a first end and a second end of the fiber optic cable containing a holder capable of securely fastening to and releasing a fiber optic connector allowing the optical connector adaptor to operatively connect via a plurality of fiber optic cable connection standards.

11. The apparatus of claim 10, wherein the one or more optical light sources comprise at least one of: a Light Emitting Diode (LED) and a laser.

12. The apparatus of claim 10, wherein the one or more optical light sources comprise a single optical light source calibrated to transmit at a specified wavelength.

13. The apparatus of claim 10, wherein the specified wavelength includes at least one of: 850 nanometers, 1300 nanometers, 1310 nanometers, and 1550 nanometers.

14. The apparatus of claim 13, wherein the one or more user controls allow a user to select a light source to operatively connect to the one or more transmitting fiber optic connectors via the optical switch.

15. The apparatus of claim 10, wherein the one or more optical light sources comprise a plurality of light sources connected via an optical switch to the one or more transmitting fiber optic connectors, and wherein each of the plurality of light sources is calibrated to transmit at a different wavelength.

16. The apparatus of claim 10, wherein the display contains an indicator of a least one of: a wavelength being measured, a wavelength being transmitted, a measurement of variance of a received signal strength from stored reference signal strength, and battery life.

17. The apparatus of claim 10, wherein at least one of the one or more optical light sources comprises a visible light source.

18. The apparatus of claim 10, further comprising an optical modulator operatively coupled to the one or more optical light sources and allowing modulation of an optical signal sent by at least one of the one or more optical light sources.

19. An apparatus for optical fiber testing comprising:
    a first plurality of receiving fiber optic connectors each capable of coupling to a fiber optic cable, wherein the first plurality of receiving fiber optic connectors comprise fiber optic connectors complying with different standards;
    one or more photodetectors operatively connected to the first plurality of receiving fiber optic connectors;
    a second plurality of receiving fiber optic connectors each capable of coupling to a fiber optic cable, wherein the second plurality of receiving fiber optic connectors comprise fiber optic connectors complying with different standards;
    one or more photodetectors operatively connected to the second plurality of receiving fiber optic connectors;

at least one optical power measurement module configured to measure optical power of the fiber optic cable, the optical power measurement module operatively connected to the one or more photodetectors associated with the first plurality of receiving fiber optic connectors and operatively connected to the one or more photodetectors associated with the second plurality of receiving fiber optic connectors;

a display configured to display information received from the optical power measurement module;

one or more user controls configured to accept user input; and a fiber optic cable operatively connected to at least one of the plurality of receiving fiber optic connectors, wherein the fiber optic cable allows at least one fiber optic connector of the first plurality to be operatively connected to a piece of fiber optic equipment, and wherein at least one fiber optic connector of the second plurality is capable of being operatively connected to at least one fiber optic cable.

20. The apparatus of claim 19, wherein the display provides an indicator indicating which plurality of receiving fiber optic connectors is receiving a signal in the event that a signal is received.

\* \* \* \* \*